United States Patent [19]
Martelli

[11] Patent Number: 5,970,823
[45] Date of Patent: Oct. 26, 1999

[54] METHOD AND DEVICE FOR ADJUSTING THE POSITION OF MOVABLE WORKING MEMBERS WITH RESPECT TO RESPECTIVE STATIONARY DATUM SURFACES

[76] Inventor: Guglielmo Martelli, 9, Main Street, Loddington-Northants NN14 1LA, United Kingdom

[21] Appl. No.: 09/058,045

[22] Filed: Apr. 9, 1998

Related U.S. Application Data

[60] Division of application No. 08/630,716, Apr. 8, 1996, Pat. No. 5,765,448, which is a continuation-in-part of application No. 08/060,595, May 11, 1993, abandoned.

[30] Foreign Application Priority Data

May 15, 1992 [IT] Italy ................................ BO92A0180

[51] Int. Cl.$^6$ ............................. B23B 29/24; B23P 1/04; B65B 41/18
[52] U.S. Cl. ............................. 74/813 L; 74/526; 29/65; 53/201
[58] Field of Search .................................. 74/526, 813 L, 74/813 C, 813 R; 82/153, 156; 29/740, 832, 833, 40, 41, 65; 53/201, 257

[56] References Cited

U.S. PATENT DOCUMENTS

| | | | |
|---|---|---|---|
| 767,592 | 8/1904 | Orbison | 29/65 X |
| 971,679 | 10/1910 | Kirby | 82/144 X |
| 1,950,039 | 3/1934 | Smith et al. | 82/25 |
| 2,361,453 | 10/1944 | Casella | 29/65 X |
| 2,712,260 | 7/1955 | Wright | 29/65 |
| 3,221,581 | 12/1965 | Johansson | 29/65 |
| 3,545,320 | 12/1970 | Anderson | 82/34 |
| 3,704,956 | 12/1972 | Poss | 408/91 |
| 3,850,051 | 11/1974 | Woltjen et al. | 74/813 L |
| 3,965,775 | 6/1976 | Pinkesfeld | 74/813 R |
| 4,006,650 | 2/1977 | Elmer | 74/813 C |
| 4,208,772 | 6/1980 | Earnhardt et al. | 29/65 X |
| 4,668,134 | 5/1987 | Vindez | 74/813 L |
| 4,887,483 | 12/1989 | Vollath | 74/527 |
| 4,934,504 | 6/1990 | Torii et al. | 74/813 L |
| 5,168,769 | 12/1992 | Nebel | 74/526 |
| 5,297,454 | 3/1994 | Ito | 74/813 L X |
| 5,315,894 | 5/1994 | Tsukada | 74/536 |

FOREIGN PATENT DOCUMENTS

| | | | |
|---|---|---|---|
| 1 206 562 | 2/1960 | France . | |
| 1 549 496 | 11/1968 | France . | |
| 2 027 175 | 12/1971 | Germany . | |
| 2 728 587 | 11/1979 | Germany . | |
| 3 446 846 | 11/1985 | Germany . | |
| 1 505 755 | 9/1989 | U.S.S.R. | 74/813 L |
| A 793 889 | 4/1958 | United Kingdom . | |
| A 856 178 | 12/1960 | United Kingdom . | |
| 1 348 125 | 3/1974 | United Kingdom | 74/813 L |

*Primary Examiner*—Vinh T. Luong
*Attorney, Agent, or Firm*—Nims, Howes, Collison, Hansen & Lackert

[57] ABSTRACT

A method for adjusting the position of a movable working member with respect to a stationary datum surface has steps of providing a packaging machine having at least one movable working member and a device for adjusting the position of the working member during a changeover operation, providing the device with a plurality of selectable stops connected to the stationary datum surface, the stops being of different length from each other, providing a sliding support supporting the working member whose position is to be adjusted, the sliding support being mounted on a guide located adjacent to the stationary datum surface and placing the sliding support in abutment with a selected stop to obtain a predetermined distance between the working member and the stationary datum surface and fixing the sliding support in this position until the next changeover operation.

5 Claims, 3 Drawing Sheets

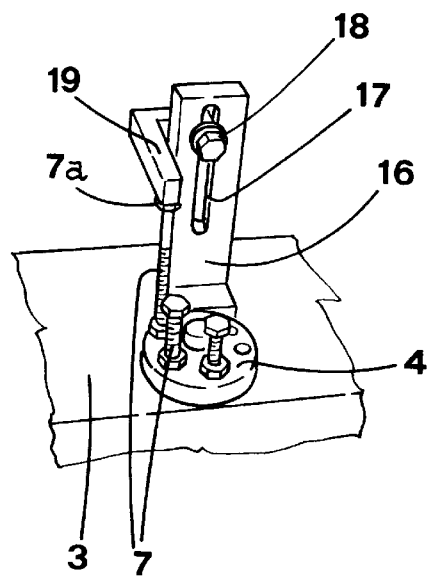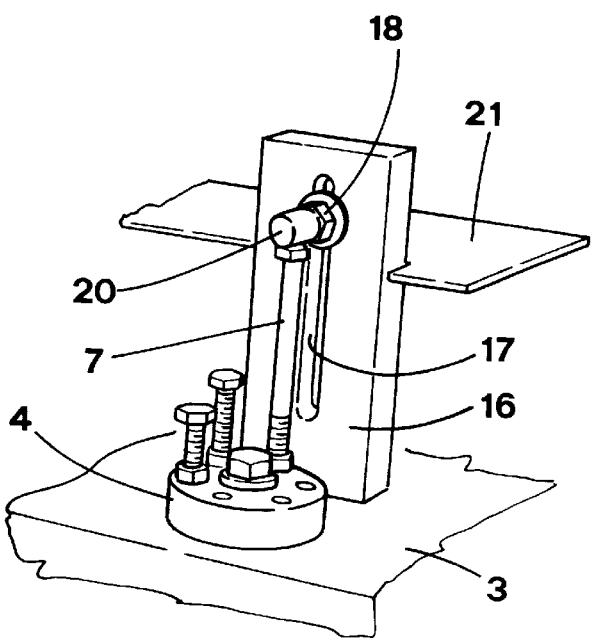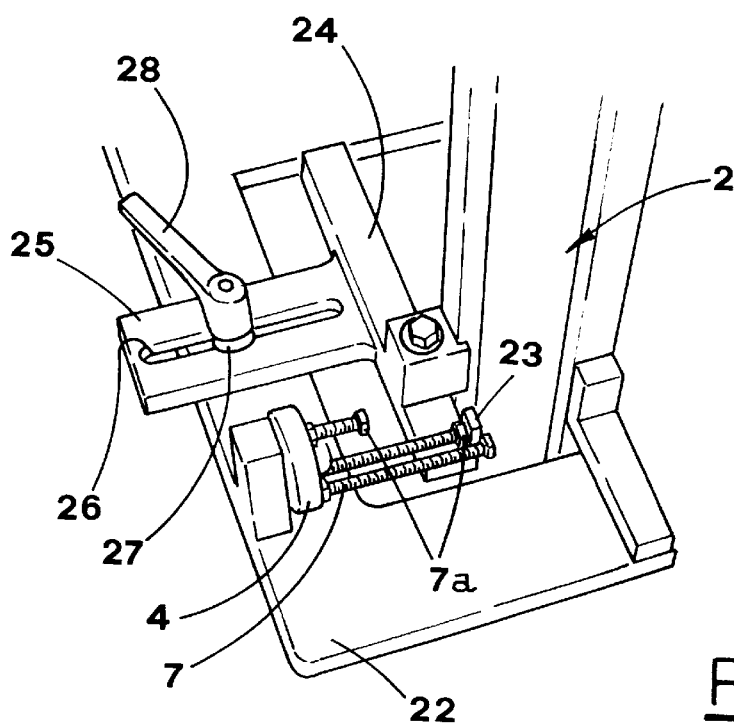

METHOD AND DEVICE FOR ADJUSTING THE POSITION OF MOVABLE WORKING MEMBERS WITH RESPECT TO RESPECTIVE STATIONARY DATUM SURFACES

CROSS REFERENCE TO RELATED APPLICATION

This application is a division of application Ser. No. 08/630,716, filed Apr. 8, 1996, now U.S. Pat. No. 5,765,448 now allowed, which was a continuation in part of application Ser. No. 08/060,595, filed May 11, 1993, now abandoned.

BACKGROUND OF THE INVENTION

The present invention relates to a device used for adjusting the position of movable working members with respect to stationary datum surfaces.

DESCRIPTION OF THE PRIOR ART

It is known that the need to locate a movable working member to different operating positions is present in many technical fields, and particularly in the construction of automatic machines.

For instance, and as a mere example, this need is evident when the position of a restraining member must be adjusted in accordance with a different dimension of an article to be restrained, for instance upon a guide along which the article is being transported to be packed.

This is one of the main problems faced by users of automatic packaging equipment, and is generally referred to as the change-over operation. Change-over usually involves substitution and adjustment of parts which are to be adapted to match the new size of the products to be handled.

At present, this problem is generally solved in an empiric way, by releasing locking means of the movable working member, and then moving the working member to the desired position where it is locked again.

It is well known that the time required for size change-over and time for production change-over are in fact rather different from each other. The reason of this difference can be found in the necessity of fine tuning the adjustment of these movable working members, which requires a considerable number of manual operations carried out after initial positioning of the working members.

Specifically, the procedure requires an operator to first move each working member, such as a guiding plate or a flap folding cam, or a magazine support, to the new position that should match the new container size.

Obviously, this proceeding is unsatisfactory as far as both productivity and precision are concerned.

Releasing and re-locking each movable working member requires a long working time, because of the necessity of finding a correct operating position with reference to the stationary datum surfaces.

The working members are never reset to the same position after the change back to a series of articles having the same shape and size are processed, because the accuracy of these positions rely on the operator's experience and ability.

To avoid incorrect positioning, a package is typically set-up at each movable working member, step by step, in order to check the position. According to the result, the position of each working member is adjusted again to accommodate slight displacements. This operation is carried out as many times as it is required to obtain perfect operation of the working members.

Recently, a number of actuating means have been used, which are connected to a central unit and designed for automatic displacement of the movable working member.

When the size of the articles being processed is changed, then a program is run which gives the machine preset instructions so as to adjust the position of the movable working member with reference to a stationary datum surface, by means of the actuating means just described.

It is clear that such a solution is rather expensive not only for fitting the device with the plural actuating means on the machine, but also for maintenance.

The device requires special fittings and a proper interface device set between the central unit and the actuating means, and these require very specialized personnel for maintenance.

Notwithstanding the complexity of this assembly, relocation of the movable working member is never as precise as it should be, because the actuating means are not able to make the movable working member take the exact old position again after they have been released and moved due to a size change over.

Accordingly, the above mentioned solution requires:

extensive electronic equipment with relatively high cost and problems of maintenance;

complex design of the machine to integrate these devices;

highly skilled operators;

long time for size change-over due to the fact that automatic adjustments must be carried out only after all replacements have been performed, for safety reasons, and fine tuning is not completely eliminated.

When manufacturers have attempted to make quick change-over by relying on actuated devices, they found that this solution is still time consuming, requires technological back-up and, in most cases such systems are rather expensive, in that they require skilled or experienced operators to manage the need of addressing instructions to the controllers.

Furthermore, to eliminate fine tuning requires additional check devices, to be sure that the operative members have been properly set.

SUMMARY OF THE INVENTION

The object of the present invention is to provide a method that allows for a quick and precise adjustment of the movable member position with respect to a stationary datum surface, without any need of specialized personnel or sophisticated devices or apparatuses.

Another object of the invention is to provide a method that is simple, quick in working and with a low production cost, also considering the result obtained by using it.

The above is obtained by means of a series of method for adjusting the position of movable working members, mounted on guiding means, with respect to stationary datum surfaces, each one of said devices including a plurality of stop means fixed to a respective datum surface, and sized with different lengths with respect to one another.

The devices which are the subject of the present invention allow anybody, no matter of his skill, to carry out each size change-over operation with only a single definitive positioning step.

The main aim of these devices is to reduce size change-over to a simple repositioning of the components, so that time for size change-over and time for production change-over become coincident, because there is no need of a checking operation.

After positioning the operative members, guiding plates, flap folding cams, etc., the machine is ready to begin full operation condition immediately, and return to the maximum rate once production resumes.

The present devices allow a dramatic reduction in the number of change-over steps by eliminating the need of fine tuning adjustments. Also complicated servo-assisted devices, difficult to use by unskilled people, simply disappear.

The devices claimed hereinafter provide multiple size calibrations for each position to be changed throughout the machine, so that a complete change-over operation on the most sophisticated machine takes one man between seven and eight minutes to accomplish.

BRIEF DESCRIPTION OF THE DRAWINGS

The characteristic features of the invention are highlighted in the following description, with particular reference to the drawings attached hereto, and in particular:

FIGS. 3, 4, 5, 6 and 7 are respectively perspective views of other applicative examples of the subject device.

DESCRIPTION OF THE PREFERRED EMBODIMENT

Figure 2:
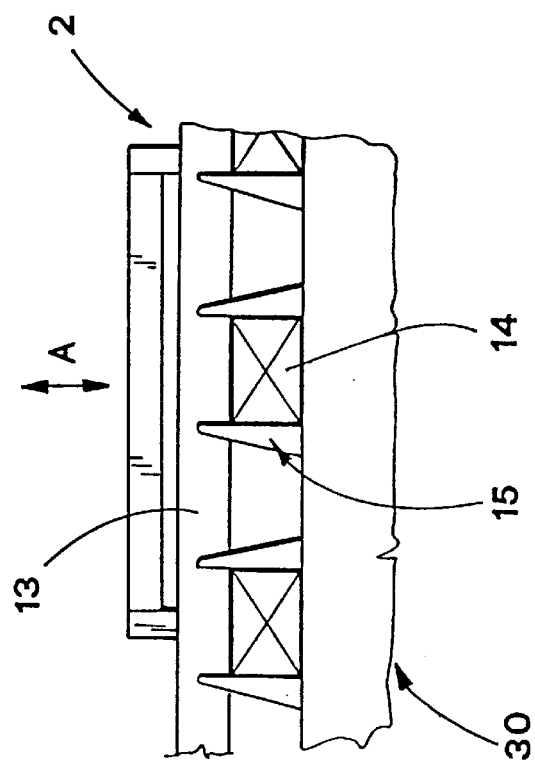
FIG. 2 shows a schematic side view of a movable working member whose position can be adjusted by means of the subject device.
Figure 1:
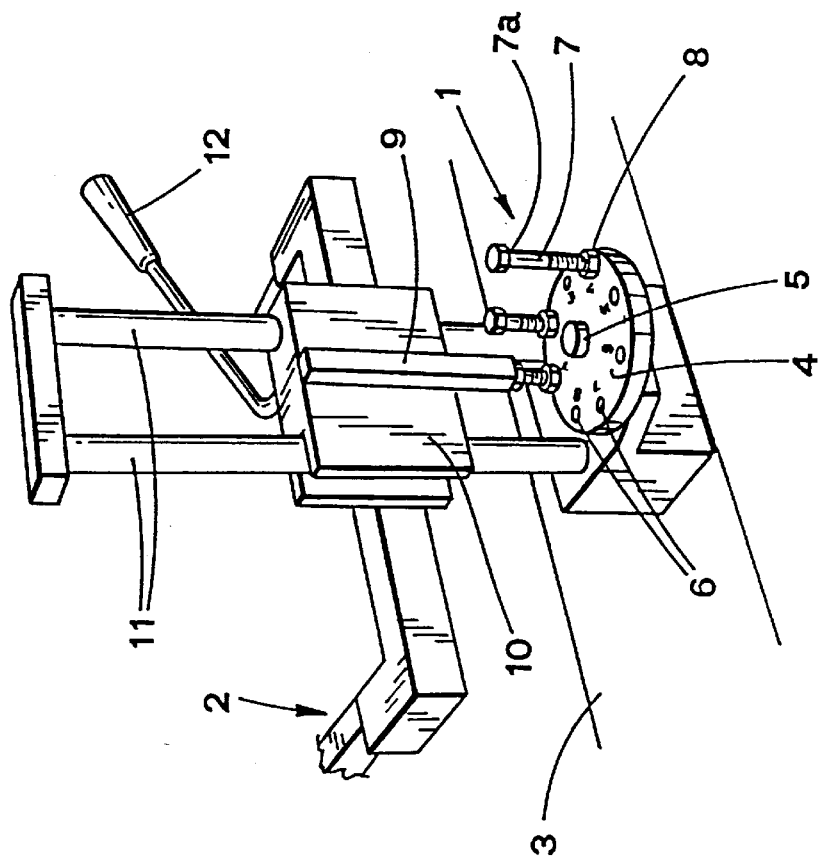
FIG. 1 shows a perspective view of a first embodiment of the adjustment device that is the subject of the present invention.

Referring first to FIGS. 1 and 2, a device is mounted on a packaging machine 30 to allow adjustment of the position of a movable working member 2 with respect to a stationary datum surface 3.

The adjustment device 1 comprises a rotatable member which is a rotary disk plate 4 that can rotate upon an axis perpendicular to the datum surface 3.

A series of stop means 7, extending in vertical direction are fixed to the disk plate 4, along the periphery thereof.

The stems are, for instance, inserted into equispaced recesses 6 made along the border of the disk and fixed therein by means of known techniques, e.g., welding.

The working member whose position is to be adjusted is mounted on a sliding support 10, e.g. set on vertical guides 11, that features a prominence 9.

The head 7a of a selected stem 7 is located in the path of the prominence 9 of the sliding support 10, so as to strike the prominence and stop the sliding support, thus setting the position of the working member 2.

The working member keeps the position firmly because of its weight. In other cases, for instance when the working member is rather light or/and when the machine section concerned is subjected to shaking, locking means 12, of known type, can be provided to fix the sliding support into the established position.

Such locking means typically utilize a clamping mechanism or a lever (both not shown) provided with a threaded end and which act as a set screw to engage one of the guides 11. When loosened, the support 10 is free to slide on the guides, but when tightened, the support is locked to the guides.

Of course, other locking devices may be used and the invention is not limited to the choice or even presence of locking means as such means may not be necessary with some packaging machines or in certain parts thereof.

In the example shown herein the working member includes a bar 13 that has the task of restraining articles 14 which are moving along a feed line under the action of holding means 15, e.g. in a cartoning machine or the like.

When the size of the articles 14 undergoing operation is changed, the bar 13 must be moved to a position corresponding to the height of the new articles, as indicated by the arrow A in FIG. 2.

To do this, after having been released, the sliding support 10 must be raised up, and the disk plate 4 is rotated until the desired stem 7 is located right under the prominence 9.

Advantageously the disk plate 4 is equipped with elastic click means designed for the definition of the various positions thereof.

The sliding support 10 is then lowered so that the prominence 9 goes to rest on the head 7a of the selected stem 7 under the action of gravity. In case of presence of locking means, the sliding support 10 is locked again in this last working position. Adjustment of the position of the movable working member 4 is therefore very quick and easy.

In particular the device allows for accuracy defining the desired position for the working member, by means of the abutment of the prominence 9 on the respective stem 7.

Moreover, it is possible to change in an almost continuous way, within a predetermined range, the distance of the movable working member 2 from the datum surface 3, by providing a suitable series of stems 7.

As an alternative, the stems can be threaded and can be fixed to the disk by means of a locking nut.

The device herein disclosed is designed to be used only on packaging machines, i.e., cartoning machines and the like, and must be used in combination, that means that more than one device must be mounted on each machine for positioning working members thereon.

All the adjustment devices are of the same type and refer to the same series of articles to be packed, and are designed to respectively adjust folding elements, folding guides, magazines, carton set-up devices, device for withdrawing carton blanks from a magazine and so on.

The operator can easily perform a size change over operation, without any complex adjusting operation and without acting on the stop members. In other words, no particular knowledge is required nor experience.

A different embodiment of the adjustment device is shown in FIG. 3, where the guides 11 are replaced with a plate 16 arranged vertical on the datum surface 3.

The plate 16 features a slot 17 and a slide moves on the plate. The slide can be fixed optionally to the plate by means of a screw that passes through the slot.

An arm 19 extends horizontally from one side of the slide and passes beside a side of the plate 16. The arm 19 goes in abutment on the head 7a of a selected stem 7 borne by the disk plate 4.

FIG. 4 shows a further embodiment of the subject device in which a plate 16, similar to the plate previously described, has a longitudinal slot 17.

In this case the sliding support 10 has a pin 20 axially protruding from the screw 18, so as to result perpendicular to the slot 17. The pin 20 goes in abutment on the head of a selected stem 7.

The plate 16 guides a horizontal tab 21 that is made integral with the sliding support 10 and that forms the movable member 2 whose position is to be adjusted.

The embodiment shown in FIG. 5 includes a base 22 that is adapted to support the disk plate 4 bearing the stems 7.

In this case the disk plate 4 rotates upon a horizontal axis. After the disk plate 4 has been rotated up to the desired position, the head 7a of the selected stem 7 is placed in the path of a wing 23 that extends vertically from a bar 24 made integral with the movable member 2.

A horizontal plate 25 extending from the bar 24 features a longitudinal slot 26, and locking means 27, that can be tightened or released by a lever 28, and that pass through the slot 26.

The position of the movable member 2 can be adjusted by moving it horizontally until the wing 23 strikes the head of the selected stem 7, thus fixing the position of the movable working L member 2 as illustrated hereinafter.

Figure 6:
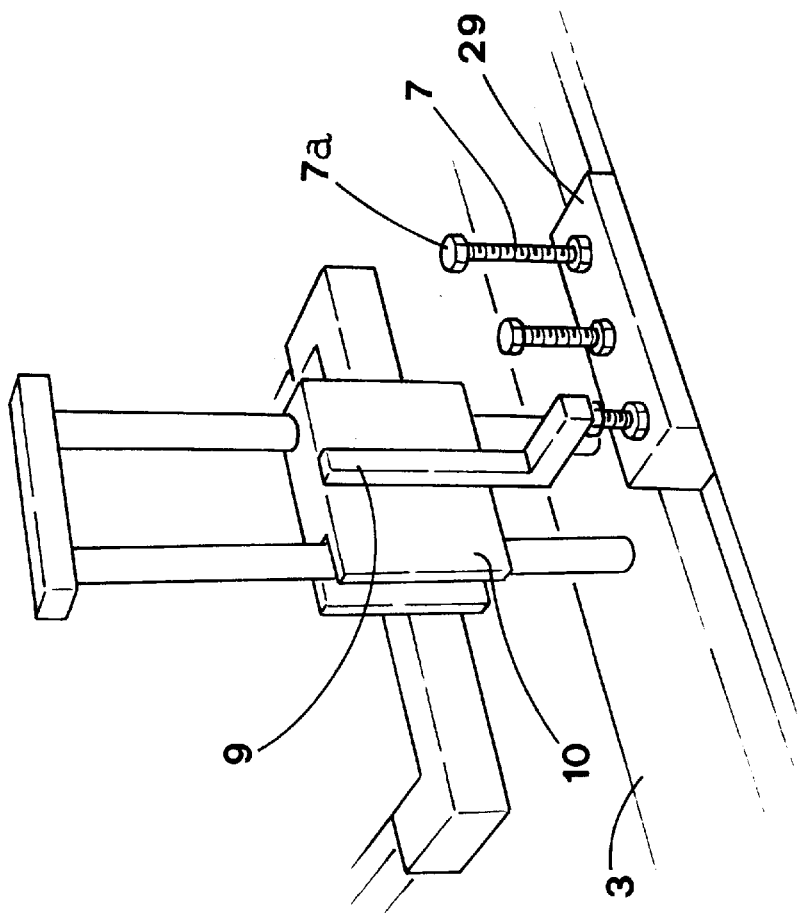

In the example shown in FIG. 6, the stems 7, which are different in length form one another, are supported by a further sliding support 29 that can slide and is guided with respect to the datum surface 3. The stems 7 are fixed to the sliding support 29 by respective nuts 8.

In this case, after unlocking the sliding support 10 that carries the movable member 2, the further sliding support 29 is displaced until the prominence 9 is lined up with the selected stem 7.

Advantageously, the further sliding support 29 is equipped with elastic click means designed to define a series of position to be selected.

As already described the sliding support 10 is moved until it goes in abutment on the head 7a of the stem 7 under the action of gravity, and then can be locked therein if locking means are present.

Figure 7:
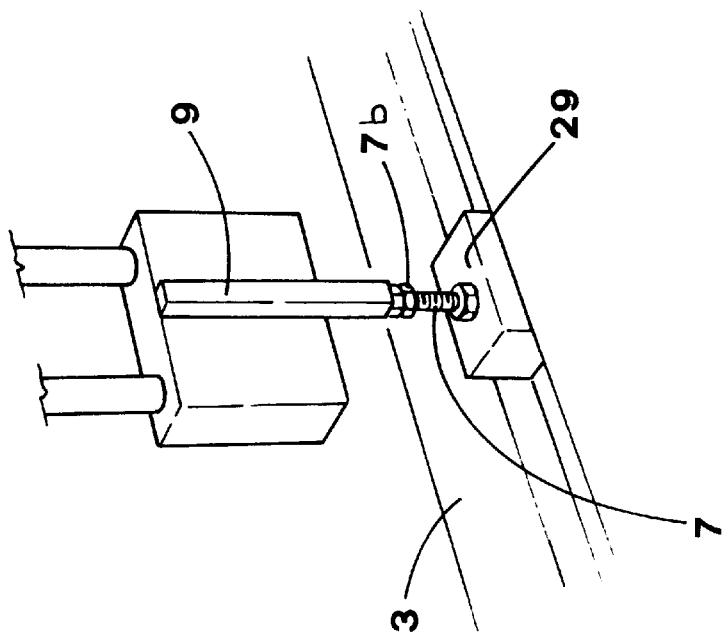

The last example shown in FIG. 7, comprises one stem 7 only, this stem being fitted to the sliding support 29 and replaceable with other stems having different length.

The method and the device described herein allow for adjusting the position of a movable working member with respect to a datum surface, in a quick and precise way, without the need of sophisticated mechanisms or machines.

The stop members, that can be adjusted and that are mounted on a rotatable or sliding support, represent the entire series of working operations that a tool performs on one product during the whole working process, and this series can be repeated endlessly without new adjustment but always rotating or moving the stop member support at each step of the series.

The machine is sold to the user with the claimed device already mounted on it, in various points, each device being already set to a certain series of lengths for the stop members, and the user cannot change the length of the stop members. The user can select the stop members, by turning the disks or shifting the support blocks, in order to adjust the position of the operative members according to the size of the cartons.

The positioning device is a part of the machine, and when it has been already set, the adjustment operation is easily carried out without the need of specialized personnel, because of the extreme simplicity that forms the basis of the device.

To make the adjustment operation easier, the stems 7, having different lengths, may be painted with different colors or bearing proper numbers, so that each stem can be immediately recognized. The adjustment obtained in this way is extremely precise, and does not depend on the experience and/or skillfulness of the operator.

As a matter of fact, the stop means described above form something like a "mechanical memory" that always ensures a correct positioning. In particular these stop means enable the positioning of movable working members in the same positions for articles having the same size which undergo operations before and after other articles having different size.

If, after the size of the articles has been changed, a stem 7 must be used for articles having the size of previous articles, then it is possible advantageously to set a nut 76 immediately under the head 7a of the stems, this nut being colored and the color being connected to a particular size (the nut is illustrated with dashed lines in FIG. 7).

In this way the stem 7 is not changed in case that changing the article size does not require to displace the movable working member to a different position, and this happens because the operator can see the different colors applied to the nut 7b, each color corresponding to a predetermined article size.

The machine manufacturer performs all the adjustment operations and the user is not permitted to change the stop member lengths. The stop members may comprise bolts only for the convenience of manufacture, since the bolts can be easily initially set to the correct distance between the head and the related reference datum surface for presetting at the factory. This avoids the need to produce a number of stems of various lengths. If bolts are used, these are fixed once the position is set by welding, or by using a suitable adhesive with the position marked to show that the bolt is indeed fixed.

It is obvious that what has been described above is only illustrative, therefore all possible constructive variants are within the protection of the innovation as claimed in the following.

What is claimed is:

1. A method for adjusting the position of at least one movable working member with respect to a stationary datum surface, in a packaging machine, the method comprising:

providing the packaging machine having the at least one working member and a device for adjusting the position of the working member during a change-over operation, for adjusting the working member to accommodate a package of a particular size with respect to the stationary datum surface, providing the device with a plurality of selectable stop means, connected to the stationary datum surface, the stop means being different in length from one another, the length corresponding to a position of the working member necessary for working the package of a particular size;

providing the device with a sliding support for supporting the working member whose position is to be adjusted, the sliding support being mounted on guide means which are adjacent to the stationary datum surface;

placing the sliding support in abutment with a selective stop means to maintain a predetermined distance between the working member and the stationary datum surface and fixing the sliding support in this position until the next changeover operation so that the predetermined distance is maintained between the working member and the datum surface.

2. The method of claim 1, further comprising providing a rotatable member, the stop means arranged along the circumference of the rotatable member which has an axis of rotation perpendicular to the stationary datum surface, and, selecting a stop means by rotating the rotatable member such that the selected stop means is placed into a position in alignment with the sliding support for abutment therewith.

3. The method as claimed in claim 2, wherein the rotatable member comprises a disk plate, the disk plate having a plurality of recesses for fitting said stop means therein.

4. The method according to claim 1, wherein the stop means comprise threaded stems, each stem being threadably set to be different in length from the others and each stem having a related nut for blocking thereof.

5. The method according to claim 1, wherein the guide means comprise a pair of uprights, and further comprising moving the sliding support along the pair of uprights.

* * * * *